(12) United States Patent
Caballero

(10) Patent No.: US 10,049,075 B2
(45) Date of Patent: *Aug. 14, 2018

(54) DEVICE MANAGEMENT USING VIRTUAL INTERFACES

(71) Applicant: Honeywell International, Inc., Fort Mill, SC (US)

(72) Inventor: Aldo Caballero, Durham, NC (US)

(73) Assignee: Honeywell International, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/079,073

(22) Filed: Mar. 24, 2016

(65) Prior Publication Data

US 2016/0203090 A1   Jul. 14, 2016

Related U.S. Application Data

(63) Continuation of application No. 14/728,397, filed on Jun. 2, 2015, now Pat. No. 9,298,667, which is a continuation of application No. 14/566,824, filed on Dec. 11, 2014, now Pat. No. 9,053,055, which is a continuation of application No. 14/143,399, filed on
(Continued)

(51) Int. Cl.
| | |
|---|---|
| *G06F 13/12* | (2006.01) |
| *G06F 13/38* | (2006.01) |
| *G06F 13/42* | (2006.01) |
| *G06F 9/54* | (2006.01) |
| *G06F 3/00* | (2006.01) |
| *G06F 13/10* | (2006.01) |

(52) U.S. Cl.
CPC ............ *G06F 13/4286* (2013.01); *G06F 3/00* (2013.01); *G06F 9/546* (2013.01); *G06F 13/102* (2013.01); *G06F 13/12* (2013.01)

(58) Field of Classification Search
None
See application file for complete search history.

(56) References Cited

U.S. PATENT DOCUMENTS

| | | | |
|---|---|---|---|
| 5,109,486 | A | 4/1992 | Seymour |
| 5,261,044 | A | 11/1993 | Dev et al. |

(Continued)

FOREIGN PATENT DOCUMENTS

| | | |
|---|---|---|
| WO | 0217073 A1 | 2/2002 |
| WO | 2005033964 A1 | 4/2005 |

*Primary Examiner* — Elisa Mamo
(74) *Attorney, Agent, or Firm* — Additon, Higgins & Pendleton, P.A.

(57) ABSTRACT

Methods managing data communication between a peripheral device and host computer system are provided. A physical interface for communicating data between a peripheral device and the plurality of applications executing on the host computer system is opened and controlled by a software module. A first virtual interface and a second virtual interface of the software module are exposed to an operating system of the host computer system, and the operating system exposes the first virtual interface and the second virtual interface to the first application and the second application. The first virtual interface is used for communicating data between the peripheral device and the first application through the physical interface, and the second virtual interface is used for communicating data between the peripheral device and the second application through the physical interface.

17 Claims, 4 Drawing Sheets

Related U.S. Application Data

Dec. 30, 2013, now Pat. No. 8,918,564, which is a continuation of application No. 13/267,342, filed on Oct. 6, 2011, now Pat. No. 8,621,123.

(56) References Cited

U.S. PATENT DOCUMENTS

| | | |
|---|---|---|
| 5,402,316 A | 3/1995 | Volz et al. |
| 5,463,742 A | 10/1995 | Kobayashi |
| 5,504,921 A | 4/1996 | Dev et al. |
| 5,546,145 A | 8/1996 | Bernardi et al. |
| 5,552,959 A | 9/1996 | Penniman et al. |
| 5,579,001 A | 11/1996 | Dempsey et al. |
| 5,579,529 A | 11/1996 | Terrell et al. |
| 5,579,775 A | 12/1996 | Dempsey et al. |
| 5,587,560 A | 12/1996 | Crooks et al. |
| 5,615,625 A | 4/1997 | Cassidy et al. |
| 5,640,953 A | 6/1997 | Bishop et al. |
| 5,655,081 A | 8/1997 | Bonnell et al. |
| 5,687,734 A | 11/1997 | Dempsey et al. |
| 5,724,509 A | 3/1998 | Starkweather et al. |
| 5,752,917 A | 5/1998 | Fuchs |
| 5,774,793 A | 6/1998 | Cooper et al. |
| 5,793,967 A | 8/1998 | Simciak et al. |
| 5,798,951 A | 8/1998 | Cho et al. |
| 5,805,442 A | 9/1998 | Crater et al. |
| 5,815,735 A | 9/1998 | Baker |
| 5,819,110 A | 10/1998 | Motoyama |
| 5,825,617 A | 10/1998 | Kochis et al. |
| 5,835,733 A | 11/1998 | Walsh et al. |
| 5,848,253 A | 12/1998 | Walsh et al. |
| 5,862,349 A | 1/1999 | Cho et al. |
| 5,867,714 A | 2/1999 | Todd et al. |
| 5,875,312 A | 2/1999 | Walsh et al. |
| 5,878,256 A | 3/1999 | Bealkowski et al. |
| 5,889,964 A | 3/1999 | Cho et al. |
| 5,921,459 A | 7/1999 | Heraly et al. |
| 5,931,909 A | 8/1999 | Taylor |
| 5,935,244 A | 8/1999 | Swamy et al. |
| 5,941,965 A | 8/1999 | Moroz et al. |
| 5,961,337 A | 10/1999 | Kordes |
| 5,978,591 A | 11/1999 | Batholomew et al. |
| 6,032,202 A | 2/2000 | Lea et al. |
| 6,037,788 A | 3/2000 | Krajec et al. |
| 6,049,454 A | 4/2000 | Howell et al. |
| 6,070,012 A | 5/2000 | Eitner et al. |
| 6,085,244 A | 7/2000 | Wookey |
| 6,088,752 A | 7/2000 | Ahem |
| 6,091,602 A | 7/2000 | Helot |
| 6,098,097 A | 8/2000 | Dean et al. |
| 6,108,717 A | 8/2000 | Kimura et al. |
| 6,109,039 A | 8/2000 | Hougham et al. |
| 6,142,593 A | 11/2000 | Kim et al. |
| 6,151,643 A | 11/2000 | Cheng et al. |
| 6,158,430 A | 12/2000 | Pfeiffer et al. |
| 6,160,719 A | 12/2000 | May et al. |
| 6,161,133 A | 12/2000 | Kikinis |
| 6,171,559 B1 | 1/2001 | Sanders et al. |
| 6,188,572 B1 | 2/2001 | Liao et al. |
| 6,195,265 B1 | 2/2001 | Choi et al. |
| 6,199,108 B1 | 3/2001 | Casey et al. |
| 6,202,209 B1 | 3/2001 | Bartholomew et al. |
| 6,226,739 B1 | 5/2001 | Eagle |
| 6,240,297 B1 | 5/2001 | Jadoul et al. |
| 6,247,074 B1 | 6/2001 | Shin et al. |
| 6,256,691 B1 | 7/2001 | Moroz et al. |
| 6,267,475 B1 | 7/2001 | Lee et al. |
| 6,279,059 B1 | 8/2001 | Ludtke et al. |
| 6,279,154 B1 | 8/2001 | Davis |
| 6,285,911 B1 | 9/2001 | Watts, Jr. et al. |
| 6,297,963 B1 | 10/2001 | Fogle |
| 6,301,106 B1 | 10/2001 | Helot et al. |
| 6,311,321 B1 | 10/2001 | Agnihotri et al. |
| 6,324,692 B1 | 11/2001 | Fiske |
| 6,330,597 B2 | 12/2001 | Collin et al. |
| 6,341,274 B1 | 1/2002 | Leon |
| 6,341,320 B1 | 1/2002 | Watts, Jr. et al. |
| 6,360,362 B1 | 3/2002 | Fichtner et al. |
| 6,378,128 B1 | 4/2002 | Edelstein et al. |
| 6,407,335 B1 | 6/2002 | Franklin-Lees et al. |
| 6,407,915 B1 | 6/2002 | Derocher et al. |
| 6,425,126 B1 | 7/2002 | Branson et al. |
| 6,442,639 B1 | 8/2002 | McElhattan et al. |
| 6,452,325 B1 | 9/2002 | Dupont |
| 6,457,076 B1 | 9/2002 | Cheng et al. |
| 6,461,181 B1 | 10/2002 | Goh et al. |
| 6,467,088 B1 | 10/2002 | alSafadi et al. |
| 6,477,588 B1 | 11/2002 | Yerazunis et al. |
| 6,484,315 B1 | 11/2002 | Ziese |
| 6,489,932 B1 | 12/2002 | Chitturi et al. |
| 6,505,121 B1 | 1/2003 | Russell |
| 6,506,009 B1 | 1/2003 | Nulman et al. |
| 6,511,031 B2 | 1/2003 | Lin |
| 6,519,143 B1 | 2/2003 | Goko et al. |
| 6,539,358 B1 | 3/2003 | Coon et al. |
| 6,542,943 B2 | 4/2003 | Cheng et al. |
| 6,558,049 B1 | 5/2003 | Shin |
| 6,560,643 B1 | 5/2003 | Shepherd et al. |
| 6,584,336 B1 | 6/2003 | Ali et al. |
| 6,584,499 B1 | 6/2003 | Jantz et al. |
| 6,587,874 B1 | 7/2003 | Golla et al. |
| 6,593,528 B2 | 7/2003 | Franklin-Lees et al. |
| 6,594,534 B1 | 7/2003 | Crowell |
| 6,606,678 B1 | 8/2003 | Nakamura et al. |
| 6,614,979 B2 | 9/2003 | Bourdeau et al. |
| 6,615,405 B1 | 9/2003 | Goldman et al. |
| 6,628,517 B1 | 9/2003 | Helot et al. |
| 6,633,482 B2 | 10/2003 | Rode |
| 6,658,659 B2 | 12/2003 | Hiller et al. |
| 6,668,296 B1 | 12/2003 | Dougherty et al. |
| 6,683,786 B2 | 1/2004 | Yin et al. |
| 6,684,241 B1 | 1/2004 | Sandick et al. |
| 6,697,032 B2 | 2/2004 | Chitturi et al. |
| 6,722,192 B2 | 4/2004 | Benedict et al. |
| 6,725,260 B1 | 4/2004 | Philyaw |
| 6,725,281 B1 | 4/2004 | Zintel et al. |
| 6,728,956 B2 | 4/2004 | Ono et al. |
| 6,742,025 B2 | 5/2004 | Jennery et al. |
| 6,751,681 B2 | 6/2004 | Torli et al. |
| 6,754,723 B2 | 6/2004 | Kato et al. |
| 6,760,761 B1 | 7/2004 | Sciacca |
| 6,763,403 B2 | 7/2004 | Cheng et al. |
| 6,766,175 B2 | 7/2004 | Uchiyama |
| 6,766,956 B1 | 7/2004 | Boylan, III et al. |
| 6,770,028 B1 | 8/2004 | Ali et al. |
| 6,772,264 B1 | 8/2004 | Dayan et al. |
| 6,778,824 B2 | 8/2004 | Wonak et al. |
| 6,779,068 B2 | 8/2004 | Kim et al. |
| 6,784,855 B2 | 8/2004 | Matthews et al. |
| 6,806,813 B1 | 10/2004 | Cheng et al. |
| 6,832,082 B1 | 12/2004 | Ramaswamy et al. |
| 6,832,373 B2 | 12/2004 | O'Neill |
| 6,833,787 B1 | 12/2004 | Levi |
| 6,833,989 B2 | 12/2004 | Helot et al. |
| 6,850,158 B1 | 2/2005 | Williams |
| 6,854,112 B2 | 2/2005 | Crespo et al. |
| 6,857,013 B2 | 2/2005 | Ramberg et al. |
| 6,863,210 B2 | 3/2005 | Becker et al. |
| 6,864,891 B2 | 3/2005 | Myers |
| 6,868,468 B2 | 3/2005 | Boz et al. |
| 6,886,104 B1 | 4/2005 | McClurg et al. |
| 6,889,263 B2 | 5/2005 | Motoyama |
| 6,895,261 B1 | 5/2005 | Palamides |
| 6,895,445 B2 | 5/2005 | Ying et al. |
| 6,898,080 B2 | 5/2005 | Yin et al. |
| 6,904,457 B2 | 6/2005 | Goodman |
| 6,907,603 B2 | 6/2005 | Scott |
| 6,915,514 B1 | 7/2005 | Machida |
| 6,920,631 B2 | 7/2005 | Delo |
| 6,928,493 B2 | 8/2005 | Motoyama |
| 6,944,854 B2 | 9/2005 | Kehne et al. |
| 6,944,858 B2 | 9/2005 | Luu |
| 6,954,142 B2 | 10/2005 | Lieberman et al. |
| 6,955,517 B2 | 10/2005 | Nulman et al. |
| 6,959,172 B2 | 10/2005 | Becker et al. |

(56) References Cited

U.S. PATENT DOCUMENTS

| | | |
|---|---|---|
| 6,961,586 B2 | 11/2005 | Barbosa et al. |
| 6,966,058 B2 | 11/2005 | Earl et al. |
| 6,968,550 B2 | 11/2005 | Branson et al. |
| 6,970,952 B2 | 11/2005 | Motoyama |
| 6,973,799 B2 | 12/2005 | Kuehl et al. |
| 6,976,062 B1 | 12/2005 | Denby et al. |
| 6,981,086 B2 | 12/2005 | Wetzel et al. |
| 6,987,988 B2 | 1/2006 | Uchiyama |
| 6,990,549 B2 | 1/2006 | Main et al. |
| 6,990,660 B2 | 1/2006 | Moshir et al. |
| 6,993,615 B2 | 1/2006 | Falcon |
| 6,993,760 B2 | 1/2006 | Peev et al. |
| 6,996,634 B1 | 2/2006 | Herrod et al. |
| 6,999,898 B2 | 2/2006 | King et al. |
| 7,000,228 B2 | 2/2006 | Mortazavi |
| 7,003,560 B1 | 2/2006 | Mullen et al. |
| 7,013,331 B2 | 3/2006 | Das |
| 7,020,571 B2 | 3/2006 | Lee et al. |
| 7,024,189 B2 | 4/2006 | Wonak et al. |
| 7,039,688 B2 | 5/2006 | Matsuda et al. |
| 7,043,537 B1 | 5/2006 | Pratt |
| 7,054,423 B2 | 5/2006 | Nebiker et al. |
| 7,054,977 B2 | 5/2006 | Kadambi et al. |
| 7,069,006 B2 | 6/2006 | Wonak |
| 7,072,675 B1 | 7/2006 | Kanakubo |
| 7,076,536 B2 | 7/2006 | Chiloyan et al. |
| 7,080,371 B1 | 7/2006 | Arnaiz et al. |
| 7,085,805 B1 | 8/2006 | Ruberg et al. |
| 7,085,824 B2 | 8/2006 | Forth et al. |
| 7,086,049 B2 | 8/2006 | Goodman |
| 7,089,551 B2 | 8/2006 | Fordemwalt et al. |
| 7,099,152 B2 | 8/2006 | Gasbarro et al. |
| 7,100,271 B2 | 9/2006 | Bauiler et al. |
| 7,107,380 B1 | 9/2006 | Mohan |
| 7,111,055 B2 | 9/2006 | Falkner |
| 7,409,478 B2 | 8/2008 | Kreiner et al. |
| 7,966,622 B1 * | 6/2011 | Purser ................ G06F 9/4411 710/104 |
| 7,996,896 B2 | 8/2011 | Duri |
| 8,423,632 B2 * | 4/2013 | Yin ................ G06F 13/102 709/220 |
| 8,621,123 B2 * | 12/2013 | Caballero ................ G06F 3/00 710/62 |
| 8,918,564 B2 | 12/2014 | Caballero |
| 9,053,055 B2 | 6/2015 | Caballero |
| 9,298,667 B2 | 3/2016 | Caballero |
| 9,436,621 B1 * | 9/2016 | Merrill ................ G06F 13/102 |
| 2001/0042112 A1 | 11/2001 | Slivka et al. |
| 2002/0073304 A1 | 6/2002 | Marsh et al. |
| 2002/0083160 A1 | 6/2002 | Middleton |
| 2002/0083432 A1 | 6/2002 | Souissi et al. |
| 2002/0086703 A1 | 7/2002 | Dimenstein et al. |
| 2002/0087392 A1 | 7/2002 | Stevens |
| 2002/0087668 A1 | 7/2002 | San Martin et al. |
| 2002/0087960 A1 | 7/2002 | Hisatake |
| 2002/0092008 A1 | 7/2002 | Kehne et al. |
| 2002/0092013 A1 | 7/2002 | Delo |
| 2002/0094208 A1 | 7/2002 | Palumbo |
| 2002/0095484 A1 | 7/2002 | Pagani et al. |
| 2002/0100036 A1 | 7/2002 | Moshir et al. |
| 2002/0109665 A1 | 8/2002 | Matthews et al. |
| 2002/0129350 A1 | 9/2002 | Wang et al. |
| 2002/0129355 A1 | 9/2002 | Velten et al. |
| 2002/0147974 A1 | 10/2002 | Wookey |
| 2002/0184349 A1 | 12/2002 | Manukyan |
| 2002/0184350 A1 | 12/2002 | Chen |
| 2002/0187024 A1 | 12/2002 | Nulman |
| 2002/0191940 A1 | 12/2002 | Bourdeau |
| 2002/0198969 A1 | 12/2002 | Engel et al. |
| 2003/0018694 A1 | 1/2003 | Chen et al. |
| 2003/0031539 A1 | 2/2003 | Nulman et al. |
| 2003/0046675 A1 | 3/2003 | Cheng et al. |
| 2003/0051235 A1 | 3/2003 | Simpson |
| 2003/0059022 A1 | 3/2003 | Nebiker et al. |
| 2003/0084436 A1 | 5/2003 | Berger et al. |
| 2003/0088651 A1 | 5/2003 | Wilson |
| 2003/0097427 A1 | 5/2003 | Parry |
| 2003/0111245 A1 | 6/2003 | Haggerty |
| 2003/0154471 A1 | 8/2003 | Teachman et al. |
| 2003/0188306 A1 | 10/2003 | Harris et al. |
| 2003/0198015 A1 | 10/2003 | Vogt |
| 2003/0217357 A1 | 11/2003 | Parry |
| 2003/0217358 A1 | 11/2003 | Thurston et al. |
| 2003/0221190 A1 | 11/2003 | Deshpande et al. |
| 2003/0225939 A1 | 12/2003 | Ying et al. |
| 2004/0002943 A1 | 1/2004 | Merrill et al. |
| 2004/0015949 A1 | 1/2004 | Taylor |
| 2004/0020974 A1 | 2/2004 | Becker et al. |
| 2004/0024933 A1 | 2/2004 | Billington et al. |
| 2004/0049233 A1 | 3/2004 | Edwards |
| 2004/0050247 A1 | 3/2004 | Topping |
| 2004/0078502 A1 | 4/2004 | Hsin et al. |
| 2004/0083471 A1 | 4/2004 | Nam et al. |
| 2004/0098571 A1 | 5/2004 | Falcon |
| 2004/0103172 A1 | 5/2004 | Chen et al. |
| 2004/0123281 A1 | 6/2004 | Olrik et al. |
| 2004/0127210 A1 | 7/2004 | Shostak |
| 2004/0139757 A1 | 7/2004 | Kuehl et al. |
| 2004/0143032 A1 | 7/2004 | Auschra et al. |
| 2004/0148600 A1 | 7/2004 | Hoshino |
| 2004/0154014 A1 | 8/2004 | Bunger |
| 2004/0168167 A1 | 8/2004 | Ono |
| 2004/0176072 A1 | 9/2004 | Gellens |
| 2004/0177380 A1 | 9/2004 | Hamel et al. |
| 2004/0181593 A1 | 9/2004 | Kanojia et al. |
| 2004/0192329 A1 | 9/2004 | Barbosa et al. |
| 2004/0199615 A1 | 10/2004 | Philyaw |
| 2004/0205709 A1 | 10/2004 | Hiltgen et al. |
| 2004/0210897 A1 | 10/2004 | Brockway et al. |
| 2004/0212822 A1 | 10/2004 | Schinner |
| 2004/0216099 A1 | 10/2004 | Okita et al. |
| 2004/0235532 A1 | 11/2004 | Matthews et al. |
| 2004/0243991 A1 | 12/2004 | Gustafson et al. |
| 2004/0243995 A1 | 12/2004 | Sheehy |
| 2004/0255023 A1 | 12/2004 | Motoyama et al. |
| 2004/0268340 A1 | 12/2004 | Steeb et al. |
| 2005/0044544 A1 | 2/2005 | Slivka et al. |
| 2005/0050538 A1 | 3/2005 | Kawamata et al. |
| 2005/0052156 A1 | 3/2005 | Liebenow |
| 2005/0060862 A1 | 3/2005 | Baulier |
| 2005/0065822 A1 | 3/2005 | Ying et al. |
| 2005/0086328 A1 | 4/2005 | Landram et al. |
| 2005/0093821 A1 | 5/2005 | Massie et al. |
| 2005/0097543 A1 | 5/2005 | Hirayama |
| 2005/0097544 A1 | 5/2005 | Kim |
| 2005/0108700 A1 | 5/2005 | Chen et al. |
| 2005/0132348 A1 | 6/2005 | Meulemans et al. |
| 2005/0132349 A1 | 6/2005 | Roberts et al. |
| 2005/0132350 A1 | 6/2005 | Markley et al. |
| 2005/0132351 A1 | 6/2005 | Randall et al. |
| 2005/0144612 A1 | 6/2005 | Wang et al. |
| 2005/0144614 A1 | 6/2005 | Moslander et al. |
| 2005/0159847 A1 | 7/2005 | Shah et al. |
| 2005/0204353 A1 | 9/2005 | Ji |
| 2005/0210458 A1 | 9/2005 | Moriyama et al. |
| 2005/0210459 A1 | 9/2005 | Henderson et al. |
| 2005/0210466 A1 | 9/2005 | Carter et al. |
| 2005/0223372 A1 | 10/2005 | Borchers |
| 2005/0223373 A1 | 10/2005 | Gage et al. |
| 2005/0229171 A1 | 10/2005 | Henry et al. |
| 2005/0235076 A1 | 10/2005 | Winarski et al. |
| 2005/0246703 A1 | 11/2005 | Ahonen |
| 2005/0251799 A1 | 11/2005 | Wang |
| 2005/0254776 A1 | 11/2005 | Morrison et al. |
| 2005/0257205 A1 | 11/2005 | Costea et al. |
| 2005/0257209 A1 | 11/2005 | Adams et al. |
| 2005/0273229 A1 | 12/2005 | Steinmeier et al. |
| 2005/0278001 A1 | 12/2005 | Qin et al. |
| 2006/0010437 A1 | 1/2006 | Marolia |

(56) References Cited

U.S. PATENT DOCUMENTS

2007/0291752 A1* 12/2007 Ben-Dvora ......... H04L 12/4641
                                                      370/389
2013/0055347 A1*  2/2013 Chawla ................ H04W 12/08
                                                      726/3
2016/0203090 A1*  7/2016 Caballero ................ G06F 3/00
                                                      710/62

* cited by examiner

DEVICE MANAGEMENT USING VIRTUAL INTERFACES

CROSS-REFERENCE TO RELATED APPLICATIONS

The present application claims the benefit of U.S. patent application Ser. No. 14/728,397 for Device Management Using Virtual Interfaces, filed Jun. 2, 2015 (and published Sep. 17, 2015 as U.S. Patent Publication No. 2015/0261719), now U.S. Pat. No. 9,298,667, which claims the benefit of U.S. patent application Ser. No. 14/566,824 for Device Management Using Virtual Interfaces, filed Dec. 11, 2014 (and published Apr. 2, 2015 as U.S. Patent Application Publication No. 2015/0095527), now U.S. Pat. No. 9,053,055, which claims the benefit of U.S. patent application Ser. No. 14/143,399 for Device Management Using Virtual Interfaces, filed Dec. 30, 2013 (and published Apr. 17, 2014 as U.S. Patent Publication No. 2014/0108682), now U.S. Pat. No. 8,918,564, which claims the benefit of U.S. patent application Ser. No. 13/267,342 for Device Management Using Virtual Interfaces, filed Oct. 6, 2011 (and published Apr. 11, 2013 as U.S. Patent Application Publication No. 2013/0091310), now U.S. Pat. No. 8,621,123. Each of the foregoing patent applications, patent publications, and patents is hereby incorporated by reference in its entirety.

FIELD OF THE INVENTION

The invention relates to data communication and more particularly to management of data communication between a host computer system and a peripheral device in communication with the host computer system.

BACKGROUND

Many types of peripheral devices connect to a host computer system on which one or more applications execute. Those who manage deployment of peripheral devices, for instance a business entity that owns point-of-sale systems comprising host computer systems attached to barcode scanning peripheral devices, routinely face the need to manage their deployed peripheral devices. Peripheral devices connect to host computer system using a variety of wired and/or wireless communication interfaces. Some interface types, for instance those of the RS232 interface standard, have a limitation where only one RS232 interface can be exposed over the physical cable connection between the peripheral device and the host computer. This single interface is commonly owned by a Line of Business application on the host computer, which, in the example involving a barcode scanner peripheral device, typically performs data collection from the scanner. A problem arises when another utility or application on the host computer desires to manage the scanner over the existing interface. Such managing becomes challenging absent interference with normal scanner operation and performance expected by the Line of Business application. For instance, the Line of Business application would release the interface, freeing the interface so that another application, such as a management application, can assume exclusive use of the interface to communicate with the scanner, which can be impractical, problematic, and inefficient.

SUMMARY

The shortcomings of the prior art are overcome and additional advantages are provided through a method of managing data communication, which method includes, for instance, opening and controlling, by a processor, a physical interface of a host computer system, the physical interface for communicating data between a peripheral device and a plurality of applications executing on the host computer system, the plurality of applications comprising a first application and a second application; exposing, in the host computer system, a first virtual interface and a second virtual interface to an operating system of the host computer system, wherein the operating system exposes the first virtual interface and the second virtual interface to the first application and the second application, the first virtual interface for communicating data between the peripheral device and the first application through the physical interface, and the second virtual interface for communicating data between the peripheral device and the second application through the physical interface; and managing data communication between the peripheral device and the first application, and between the peripheral device and the second application.

Additional features and advantages are realized through the concepts of the present invention. Other embodiments and aspects of the invention are described in detail herein and are considered a part of the claimed invention.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION

Figure 1:
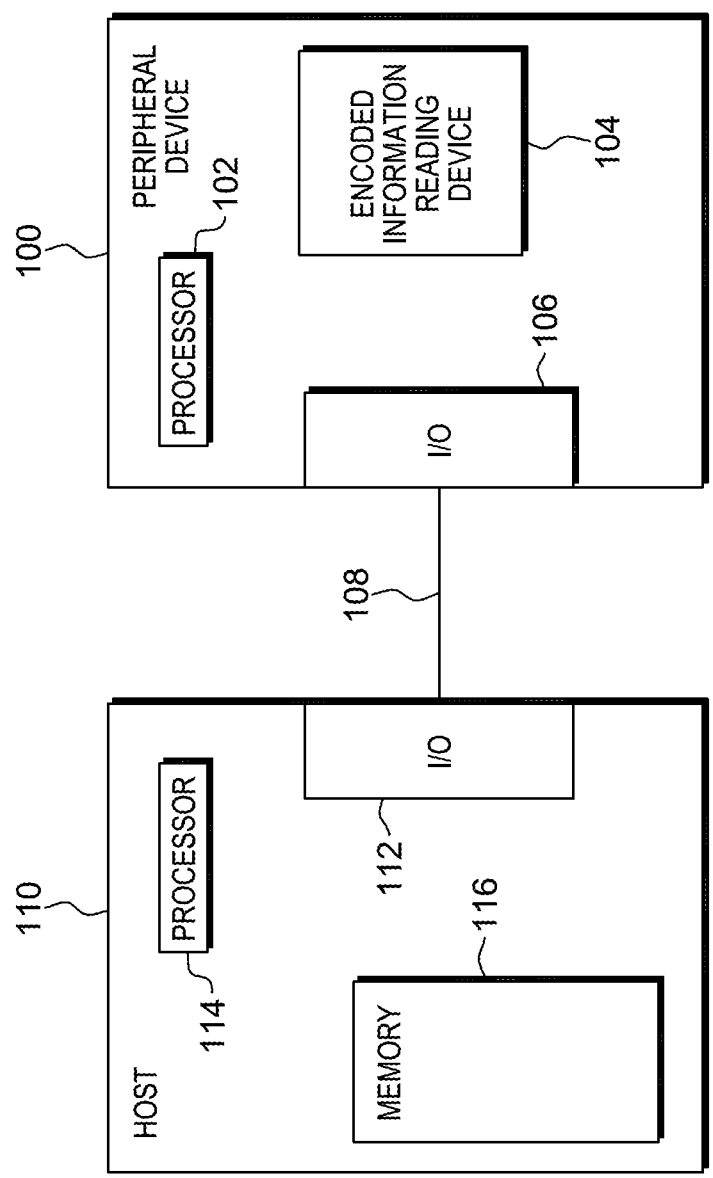
FIG. 1 depicts one example of a host computer system in communication with a peripheral device, in accordance with one or more aspects of the present invention.

FIG. 1 depicts one example of a host computer system in communication with a peripheral device, in accordance with one or more aspects of the present invention. In FIG. 1, peripheral device 100 communicates with host computer system 110 across communications link 108. Communications link 108 can be any appropriate wired or wireless communication channel that supports analog or digital communication of data between peripheral device 100 and host 110. A non-limiting list of example communication links includes RS232 (such as a serial connection operating according to the RS232 standard), Universal Serial Bus, Wi-Fi™ and Bluetooth™ connections. In an embodiment where communications link 108 comprises a Universal Serial Bus communications link, peripheral device 100 can present itself to host computer system 110 as a Universal Serial Bus Serial device or a Universal Serial Bus Human Interface Device Barcode scanner.

By way of specific example, peripheral device 100 is an encoded information reading terminal comprising a processor 102 and one or more encoded information reading device 104. Encoded information reading device 104 can be provided, e.g. by a bar code reading device, an RFID reading device, and a card reading device. Encoded information reading device 104 can be operative to output one or more of a decoded message decoded from raw signal or a raw signal comprising an encoded message. Shown in the block view as being provided by a separate unit external to processor 102 processing functionality of encoded information device 104 can be provided by processor 102. In operation of peripheral device 100, image signals can be read out of encoded information reading device 104 and stored into a volatile or non-volatile memory (not pictured), such as random access memory, read only memory, or any other type of storage memory. Processor 102 can be adapted to perform various algorithms including reading out image data stored in memory and/or algorithms supporting communication of data across communications link 108 via one or more I/O component(s) 106.

Host 110 similarly includes I/O component(s) 112. I/O components include one or more physical interfaces for communicating data to/from peripheral device 100. These interfaces comprise one or more hardware components. In the example of an RS232 communications link, a supporting physical interface comprises a hardware serial port, as an example.

Host 110 also includes processor 114 and memory 116. Memory 116 can include one or more volatile or non-volatile memories of one or more types, such as random access memory, read only memory, or any other type of storage memory, such as a hard disk drive. Further details of host 110 are described with reference to FIG. 2.

Figure 2:
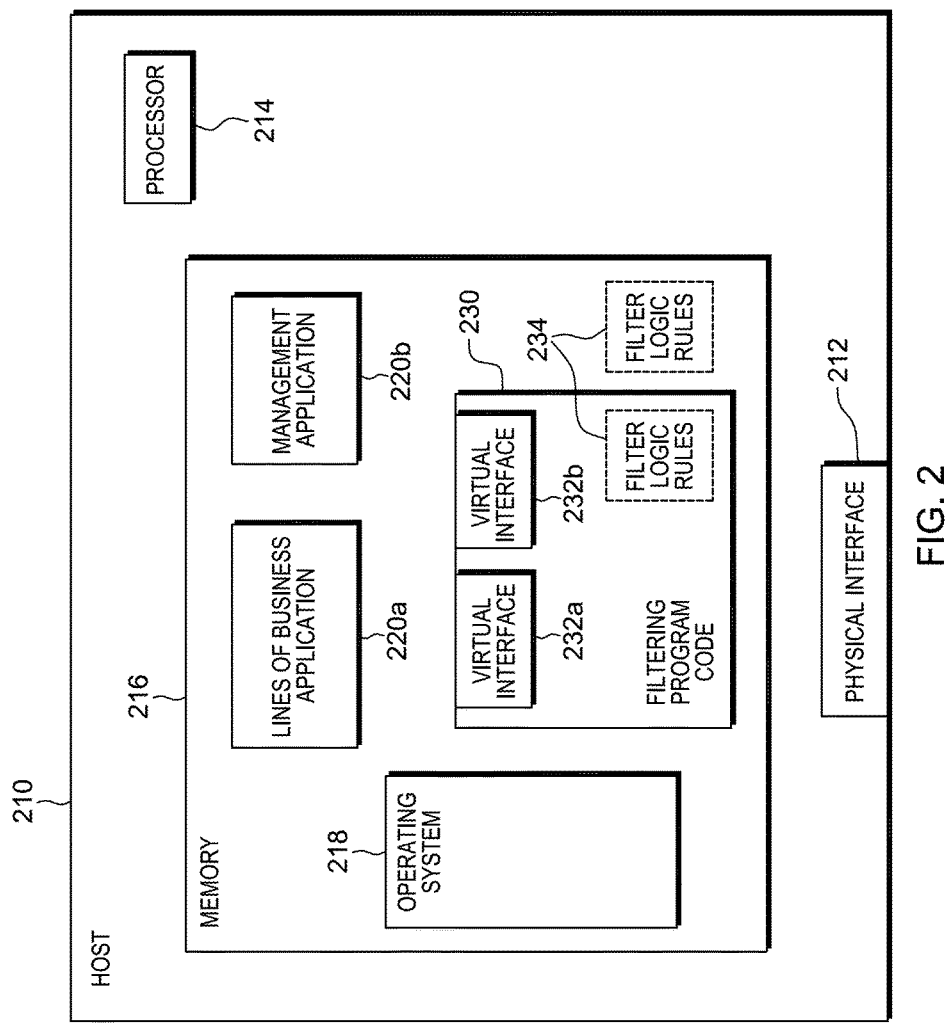
FIG. 2 depicts further details of a host computer system, in accordance with one or more aspects of the present invention.

FIG. 2 depicts further details of a host computer system in accordance with one or more aspects of the present invention. In FIG. 2, host 210 includes physical interface 212, processor 214, and memory 216. As is understood by those having ordinary skill in the art, a processor can be configured to execute instructions of a program. Common such programs are an operating system and applications which run on the operating system. In FIG. 2, processor 214 executes operating system 218 and applications 220a and 220b. Application 220a comprises a line of business application. A line of business (LOB), in general, is a group of one or more related applications or modules which service a business need. In the context of host-peripheral device communication, a line of business application may be responsible for sending data to and/or receiving data from a peripheral device. In the specific example of a barcode scanner, the line of business application can execute on the host machine and accept from the peripheral device decoded data which is read-out from an encoded image (such as a barcode) using the peripheral device.

Application 220b in FIG. 2 comprises a management application. Management application 220b supports device management of a peripheral device, such as peripheral device 100 of FIG. 1. Examples of device management include performance of a firmware upgrade of the firmware of the peripheral device, and performance of a reconfiguration of the peripheral device, such as a reconfiguration to adjust one or more operating parameters of the peripheral device.

Aspects of the current invention define a software module for a host computer. The software module opens and owns a physical interface, such as an RS232 I/O port, to which a peripheral device is attached. It also exposes multiple virtual interfaces, such as virtual RS232 interfaces, to the operating system of the host.

The software module can manage data communication between the peripheral device and one or more applications executing on the host computer system by properly routing data coming from the peripheral device to the one or more applications of the host, or data going from the one or more applications of the host to the peripheral device. This facilitates communication between a line of business application and the peripheral device without the line of business application being aware that the physical interface is being shared with other applications, such as a management tool, behind the scenes.

Filtering program code 230 of FIG. 2 is an example software module. Filtering program code 230 opens and controls physical interface 212, which is a physical interface through which host 210 communicates with a peripheral device, such as a barcode scanner. Filtering program code 230 exposes a first virtual interface 232a and a second virtual interface 232b to operating system 218. While filter program code 230 exposes two virtual interfaces in the example of FIG. 2, it should be understood that filtering program code 230 could expose any desirable number of virtual interfaces depending on the particular scenario, for instance the number of applications on the host that will communicate with the peripheral device. By exposing virtual interfaces 232a, 232b to operating system 218, operating system 218 can then make these interfaces available to applications executing on operating system 218. This allows each application to be configured to use a respective one of the virtual interfaces 232a, 232b to send and receive data communication. In FIG. 2, operating system 218 exposes virtual interfaces 232a, 232b to line of business application 220a and management application 220b. Then, line of business application 220a can be configured (for instance, manually by a user or automatically) to use virtual interface 232a for communicating data between the peripheral device and line of business application 220a, while management application 220b can be configured (for instance, manually by a user or automatically) to use virtual interface 232b for communicating data between the peripheral device and management application 220b.

Filter program code 230 effectively allows performing device management by management application 220b in parallel with a data collection processes whereby data is communicated to a separate line of business application (e.g. 220a), without affecting the performance or expected operation for a user and line of business application 220a. In a further enhancement, filter program code 230 can also support configuration requests to change its behavior (timeouts, filtering logic described below). In this manner, the code can be reconfigured to, for instance, make the filtering logic be based on a different pattern(s), or change a maximum timeout for the code to remain in a transaction mode giving the management application exclusive access to the device. An example of such a configuration request is a Windows Input/Output Control (IOCTL) call/request, when filter program code 230 comprises a Microsoft® Windows® based driver.

In one example, filter program code 230 comprises a device driver, such as a filter driver for the Windows® operating system offered by Microsoft Corporation. The software can be a driver such as a "driver service" which is a kernel-level filter driver implemented as a Windows® service.

The driver installation can be made non-intrusive with no dialog prompts and no security warnings for the user. The actual driver can internally be comprised of multiple drivers, depending on the operating system requirements. The driver can be written as a kernel-level driver for a kernel of operating system 218, whereby the driver exposes the two or more (depending on the number of applications to support) virtual interfaces in the operating system. Additionally, an installation tool can allow a user to preselect what the desired virtual interface (port) numbers should be.

Continuing with FIG. 2, filter program code 230 can use one or more filter logic rules 234 defining filtering rules for filtering data received from a peripheral device to an appropriate application to which the data directed. Filter logic rules 234 are depicted as being optionally hard-coded into filter program code 230, or in a separate module in memory 216 external to filter program code 230. In the later example, filter logic rules 234 can comprise one or more scripts in a text file stored in memory 216. By maintaining externally loaded filter logic rules, external to filter program code 230, the rules can be easily updated without having to recompile the filter program code. This is especially useful in the case where filter program code comprises a driver, because of the security, stability, and compatibility sensitivities involved in modifying device drivers of an operating system. Alternatively or additionally, filter logic rules 234 can be maintained within filtering program code 230, if so desired.

Filter logic rules can be in any format recognizable to the software module (e.g. filter program code) to enable it to properly filter data communications to the appropriate destination. In this respect, the rules can describe one or more of:

The format of the incoming data from the peripheral device, and more particularly the format of data intended for particular application(s) (for instance data intended for only the line of business application, for only the management application, or for both the line or business application and the management application) so that the software module can recognize and route/filter this incoming data to the proper application(s)

How to handle custom events/procedures, such as (i) the shielding of the virtual interface used by the line of business application from a peripheral device reboot event, such as a reboot event triggered by the management application, and/or (ii) the freezing of some or all data communication from/to the virtual interface used by the line of business application while the management application performs a reconfiguration or firmware upgrade of the peripheral device (i.e.: freeze timeout for a "transaction mode"). In this regard, when the management application communicates with the peripheral device, this may cause the line of business application to detect configuration changes or events, and this may be undesirable. To prevent this, in the former scenario (shielding), the software module can "shield" the line of business application from a peripheral device reboot event so that the application's connection handle, which is owned by the line of business application and represents the communication path to the virtual interface exposed to the line of business application by the software module, is preserved. This effectively prevents, by the software module, the reboot event (in the form of data communication received from the peripheral device to the host) from permeating through to the line of business application. In the later scenario (freezing for transaction mode), data received from/to the virtual interface used by the line of business application while that interface is frozen may be queued until the freeze timeout expires. The idea is that if the management application requests operation in a transaction mode, it will have exclusive access to the device, until it has completed the tasks it needs. It can be seen as an atomic operation, where the management application temporarily overtakes the peripheral device from the line of business application to perform some task(s). When done, access to the device is restored to the line of business application, all while keeping the line of business application unaware of the interruption.

How to handle simultaneous virtual interface requests, such as simultaneous requests to the virtual interfaces made by the line of business application and the management application. The filter logic rules can indicate which virtual interface receives data communication routing preference and how that preference is carried out by the software module so as to not affect performance of the line of business application.

Figure 3:
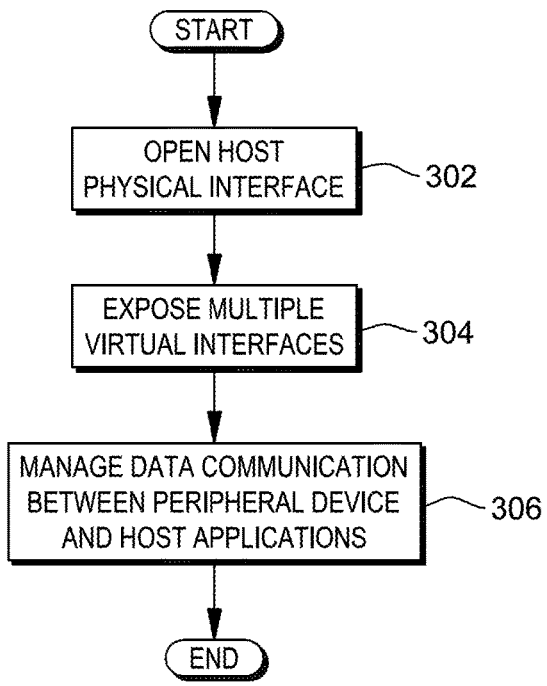
FIG. 3 depicts one example of a process for managing data communication, in accordance with one or more aspects of the present invention.

As noted, filter logic rules are employed in facilitating management of data communication. FIG. 3 depicts one example of a process for managing data communication, in accordance with one or more aspects of the present invention. In one example, this process is performed by way of a software module executing on a processor, such as a processor of a host computer system. The process begins by the software module opening the host physical interface (302). In one example, software module comprises a driver that opens and 'owns' the physical interface. Next, multiple virtual interfaces are exposed to the host operating system (304). As described above, some physical interfaces, such as RS232 interface supports only one interface to be exposed over the physical connection (cable) between the host computer and the peripheral device. The multiple virtual interfaces become the interfaces through which multiple applications may communicate across the (single) physical interface with a peripheral device connected to the host computer system. After the host applications are configured to use the appropriate virtual interface (described below), management of data communication between the peripheral device and host applications (306) is enabled, and the process ends.

Figure 4:
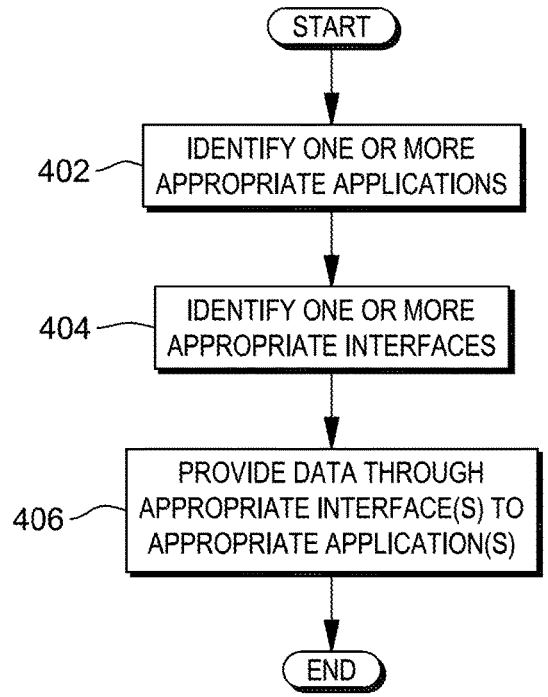
FIG. 4 depicts one example of managing data communication between a peripheral device and host applications, in accordance with one or more aspects of the present invention.

Management of data communication between a peripheral device and host applications is described and depicted in further detail with reference to FIG. 4, depicting an example process thereof, in accordance with one or more aspects of the present invention. The process begins with the identification of one or more appropriate applications to which received data is to be communicated (402). In one example, this is initiated responsive to receipt by the software module of data from the peripheral device. In one example, the identification is facilitated by examining the data, such as a packet header of a data packet, to determine (based on the filter logic rules) one or more appropriate applications to which the data is to be filtered/routed. It should be noted that it may be desirable to provide some data (e.g. barcode data, image data, device operation statistics) to more than one application. Next, the process identifies one or more appropriate virtual interfaces through which the received data is to be provided (404). In accordance with an aspect of the present invention, each virtual interface will exist to service data communication with a different type of application, and each application to which the peripheral device sends data will be configured to use the virtual interface of the multiple exposed virtual interfaces which is dedicated exclusively to servicing data communication with that type application. The software module can be aware of which virtual interface services which type of application of the multiple applications. Thus, in the example in which a line of business application and a management application execute on a host computer system, a first virtual interface of the virtual interfaces will be dedicated to the line of business application, and a second virtual interface of the virtual interfaces will be dedicated to the management application. Identification of the one or more appropriate virtual interfaces through which the data is to be provided to the appropriate applications (404) is based on the identified application(s) that are to receive the data communication—for instance, if the examination of the data and comparison to the filter logic rules indicates that the data is to be provided only to the line of business application, then the appropriate virtual interface (i.e. that dedicated to the line of business application) is identified. Following this, the data is provided to the appropriate application(s) through the appropriate interface(s) (406).

In conjunction with the logic of the software module, the peripheral device identifies the type of data that it is sending to the host. In one example, data is 'wrapped' in one or more packets having a format recognizable by the software module. This format can be the format described in one or more filter logic rules on the host computer, to facilitate identification by the host of the proper application executing thereon to which the data is to be provided. For instance, the peripheral device can identify that data being sent to the host is data intended for the line of business application. Identification of the type of data wrapped in a packet and/or the application to which the data is intended can be provided through one or more indicators (e.g. bits) in the data packet, and, in one example, in a header of the data packet. In the context of FIG. 2, such identification enables the peripheral device to send unsolicited notifications, such as decoding statistics and diagnostics events, to a management application, which unsolicited notifications are not intended for the line of business application.

Advantageously, aspects of the present invention can enable the management of data communications as described above without the need to modify and/or recompile the applications executing on the host. Instead, the applications need only be configured to use the appropriate virtual interface dedicated to data communication for that particular application, rather than to use the physical interface. In many instances, the appropriate interface for the application to use is provided by a single configuration setting in the application which enables the selection of an interface from a list of interfaces presented by the operating system to the application. The single configuration setting would be simply to point the application to the appropriate virtual interface rather than the physical interface.

Aspects of the present invention can be applied to any type of interface used by a peripheral device. The software module in the host can simply virtualize the original physical interface and expose two (or more) new virtual interfaces as described above. Thus, aspects of the present invention are applicable for Universal Serial Bus physical interfaces, as well as many other physical interfaces as will be appreciated by those having ordinary skill in the art.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 5:
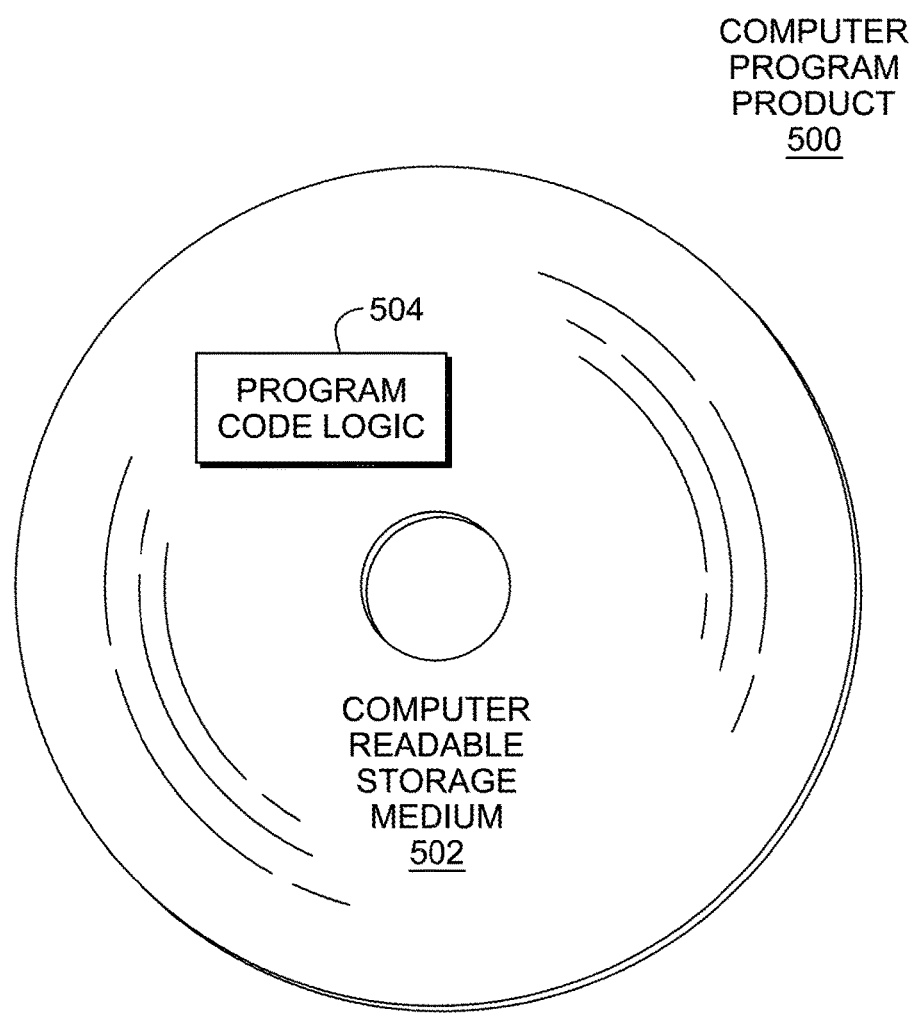
FIG. 5 depicts one embodiment of a computer program product to incorporate one or more aspects of the present invention.

Referring now to FIG. 5, in one example, a computer program product 500 includes, for instance, one or more computer readable media 502 to store computer readable program code means or logic 504 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A small sample of methods that are described herein is as follows:

A1. A method of managing data communication, the method comprising: opening and controlling, by a processor, a physical interface of a host computer system, the physical interface for communicating data between a peripheral device and a plurality of applications executing on the host computer system, the plurality of applications comprising a first application and a second application; exposing, in the host computer system, a first virtual interface and a second virtual interface to an operating system of the host computer system, wherein the operating system exposes the first virtual interface and the second virtual interface to the first application and the second application, the first virtual interface for communicating data between the peripheral device and the first application through the physical interface, and the second virtual interface for communicating data between the peripheral device and the second application through the physical interface; and managing data communication between the peripheral device and the first application, and between the peripheral device and the second application.

A2. The method of A1, wherein the peripheral device comprises an encoded information reading terminal comprising an encoded information reading device configured to output a decoded message, wherein the first application comprises a line of business application for receiving the decoded message from the encoded information reading terminal, and wherein the second application comprises a management application for managing the encoded information reading terminal.

A3. The method of A1, wherein the managing data communication between the peripheral device and the first application and between the peripheral device and the second application comprises filtering data received from the peripheral device through the physical interface to the first application and the second application, the filtering comprising: identifying one or more appropriate applications of the first application and the second application to which the received data is to be provided; identifying one or more appropriate virtual interfaces of the first virtual interface and the second virtual interface through which the received data is to be provided; and providing the received data through the appropriate one or more virtual interfaces to the appropriate one or more applications, wherein received data is provided to the first application through the first virtual interface and wherein received data is provided to the second application through the second virtual interface.

A4. The method of A3, wherein one or more filter logic rules define one or more rules for filtering received data to one or more appropriate applications of the first application and the second application.

A5. The method of A4, wherein the one or more filter logic rules describe a format of incoming data from the peripheral device to distinguish between data intended for different applications of the first application and the second application.

A6. The method of A5, wherein the received data is provided by the peripheral device through the physical interface in the described format to facilitate identifying the one or more appropriate applications to which the received data is to be provided, and wherein the identifying identifies the one or more appropriate applications based on the description of the format provided by the one or more filter logic rules.

A7. The method of A4, wherein the first application comprises a line of business application, wherein the second application comprises a management application, wherein a filter logic rule of the one or more filter logic rules defines how a peripheral device reboot event is to be handled to shield the line of business application from the reboot event in order to facilitate preservation of a connection handle of the line of business application to the peripheral device, and wherein another filter logic rule of the one or more filter logic rules identifies how to freeze data communication to or from the line of business application during performance of peripheral device management by the management application.

A8. The method of A4, wherein the received data comprises simultaneous requests for the first application and for the second application, and wherein at least one filter logic rule of the one or more filter logic rules identifies how the host computer system is to handle the simultaneous requests.

A9. The method of A3, wherein the filtering is performed by a filter driver of the operating system, and wherein one or more filter logic rules are maintained in a filter logic rules file external to the filter driver to facilitate updating the filter logic rules separately from the filter driver absent a need to recompile the filter driver upon updating the filter logic rules.

A10. The method of A9, wherein the filter driver supports configuration requests to change behavior of the filter driver in performing the filtering.

A11. The method of A9, wherein the filter driver comprises a kernel-level driver of a kernel of the operating system, the kernel-level driver for exposing the first virtual interface and the second virtual interface to the operations system.

A12. The method of A1, wherein a driver of the operating system opens and owns the physical interface and exposes the first virtual interface and the second virtual interface to the operating system, and wherein the first application is configured to utilize the first virtual interface for data communication with the peripheral device, and wherein the second application is configured to utilize the second virtual interface for data communication with the peripheral device.

A13. The method of A1, wherein the physical interface comprises an RS232 interface supporting only a single interface connection between the RS232 interface and the peripheral device.

A14. The method of A1, wherein the peripheral device comprises an encoded information reading device configured to output a decoded message, wherein data communicated between the peripheral device and the host computer system comprises the decoded message and wherein the decoded message is communicated to a line of business application of the multiple applications executing on the host computer system.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. A method, comprising:
opening and controlling, with a processor, a physical interface communicating with at least one device and applications, the applications comprising a first application and a second application;
exposing, with the processor, a first virtual interface to an operating system and the first application, wherein the first virtual interface handles communication between the at least one device and the first application via the physical interface;
exposing, with the processor, a second virtual interface, separate from the first virtual interface, to the operating system and the second application, wherein the second virtual interface handles communication between the at least one device and the second application via the physical interface; and
managing, with the processor, communication (i) between the at least one device and the first application and (ii) between the at least one device and the second application, the managing of communication comprising:
receiving data from the at least one device through the physical interface,
identifying one or more applications to which the received data should be provided,
identifying one or more virtual interfaces through which the received data should be provided, and
providing the received data through the identified one or more virtual interfaces to the identified one or more applications.

2. The method of claim 1, wherein:
the at least one device outputs a decoded message;
the first application comprises a line of business application for receiving the decoded message from the at least one device; and
the second application comprises a management application for managing the at least one device.

3. The method of claim 1, wherein identifying one or more applications to which the received data should be provided comprises identifying one or more applications based on one or more filter logic rules.

4. The method of claim 3, wherein:
the first application comprises a line of business application;
the second application comprises a management application;

a filter logic rule of the one or more filter logic rules defines how a device reboot event is to be handled to shield the line of business application from the reboot event in order to facilitate preservation of a connection handle of the line of business application to the at least one device; and another filter logic rule of the one or more filter logic rules identifies how to freeze communication to or from the line of business application during performance of device management by the management application.

5. The method of claim 3, wherein;
the received data comprises simultaneous requests for the first application and for the second application; and
at least one filter logic rule of the one or more filter logic rules identifies how a host computer system is to handle the simultaneous requests.

6. The method of claim 1, wherein managing, with the processor, data communication comprises:
receiving data from the at least one device through the physical interface;
identifying, with a filter driver on the operating system, one or more applications to which the received data should be provided;
identifying, with the filter driver, one or more virtual interfaces through which the received data should be provided; and
providing, with the filter driver, the received data through the identified one or more virtual interfaces to the identified one or more applications;
wherein one or more filter logic rules applied by the filter drive are stored external to the filter drive.

7. The method of claim 1, wherein:
a driver of the operating system opens and owns the physical interface and exposes the first virtual interface and the second virtual interface to the operating system;
the first application is configured to utilize the first virtual interface for data communication with the at least one device; and
the second application is configured to utilize the second virtual interface for data communication with the at least one device.

8. A method, comprising:
opening and controlling, with a processor, a physical interface communicating with at least one peripheral device and applications, the applications comprising a first application and a second application;
exposing, with the processor, a first virtual interface to an operating system and the first application, wherein the first virtual interface handles communication between the at least one peripheral device and the first application via the physical interface;
exposing, with the processor, a second virtual interface, separate from the first virtual interface, to the operating system and the second application, wherein the second virtual interface handles communication between the at least one peripheral device and the second application via the physical interface; and
managing, with the processor, communication (i) between the at least one peripheral device and the first application and (ii) between the at least one peripheral device and the second application, the managing of communication comprising:
receiving data from the at least one device through the physical interface,
identifying one or more applications to which the received data should be provided,
identifying one or more virtual interfaces through which the received data should be provided, and
providing the received data through the identified one or more virtual interfaces to the identified one or more applications.

9. The method of claim 8, wherein:
the at least one peripheral device comprises an encoded information reading device configured to output a decoded message;
the first application comprises a line of business application for receiving the decoded message from the encoded information reading device; and
the second application comprises a management application for managing the encoded information reading device.

10. The method of claim 8, wherein identifying one or more applications to which the received data should be provided comprises identifying one or more applications based on one or more filter logic rules.

11. The method of claim 10, wherein the one or more filter logic rules describe a format of incoming data from the at least one peripheral device to distinguish between data intended for different applications of the first application and the second application.

12. The method of claim 8, wherein managing, with the processor, data communication comprises:
receiving data from the at least one peripheral device through the physical interface;
identifying one or more applications to which the received data should be provided;
identifying one or more virtual interfaces through which the received data should be provided; and
providing the received data through the identified one or more virtual interfaces to the identified one or more applications.

13. The method of claim 8, wherein;
the at least one peripheral device comprises an encoded information reading device configured to output a decoded message;
data communicated between the at least one peripheral device and a host computer system comprises the decoded message; and
the decoded message is communicated to a line of business application of the applications executing on the host computer system.

14. A system, comprising:
an operating system;
a first application;
a second application;
a physical interface communicating with at least one device, the device configured to read encoded information;
a first virtual interface to handle communication between the at least one device and the first application via the physical interface; and
a second virtual interface, separate from the first virtual interface, to handle communication between the at least one device and the second application via the physical interface; and
a processor for:
opening and controlling the physical interface;
exposing the first virtual interface to the operating system and the first application;
exposing the second virtual interface to the operating system and the second application;
managing the communication between the at least one device and the first application; and managing the communication between the at least one device and the second application, the managing of communication comprising:
- receiving data from the at least one device through the physical interface,
- identifying one or more applications to which the received data should be provided,
- identifying one or more virtual interfaces through which the received data should be provided, and
- providing the received data through the identified one or more virtual interfaces to the identified one or more applications.

15. The system of claim 14, wherein:

the at least one device outputs a decoded message;

the first application comprises a line of business application for receiving the decoded message from the at least one device; and the second application comprises a management application for managing the at least one device.

16. The system of claim 14, wherein the processor identifies one or more applications to which the received data should be provided based on one or more filter logic rules.

17. The system of claim 16, wherein the one or more filter logic rules describe a format of incoming data from the at least one device to distinguish between data intended for different applications of the first application and the second application.

* * * * *